United States Patent Office 2,894,969
Patented July 14, 1959

2,894,969

FLUORINATED ALKYL ORGANOSILICON COMPOUNDS

Ogden R. Pierce, Midland, Mich., assignor to Dow Corning Corporation, Midland, Mich., a corporation of Michigan No Drawing. Application March 7, 1957
Serial No. 644,479

10 Claims. (Cl. 260—448.2)

This invention relates to fluorinated-isoalkyl organosilicon compounds.

More specifically this invention relates to compositions of the formula $$[H(\overset{Y}{C}HCH_2)_n]_a SiR_m Cl_{4-m-a}$$

where Y is a perfluoroalkyl radical of from 1 to 3 inclusive carbon atoms, R is selected from the group consisting of monovalent hydrocarbon radicals, their halogenated derivatives and hydrogen, $n$ is an integer from 2 to 4 inclusive, $a$ is an integer from 1 to 3 inclusive, $m$ is an integer from 0 to 2 inclusive, and $(m+a)$ is not greater than 3.

Y can be trifluoromethyl, pentafluoroethyl and heptafluoropropyl. R can be hydrogen or any monovalent hydrocarbon radical, for instance, alkyl radicals such as methyl, ethyl, tert-butyl, 2-ethyl hexyl and octadecyl, cycloalkyl radicals such as cyclopentyl and cyclohexyl, alkenyl radicals such as vinyl, allyl and butadienyl, cycloalkenyl radicals such as 3,4-cyclopentenyl and 2,3-cyclohexenyl, aryl radicals such as phenyl, xenyl and naphthyl, alkaryl radicals such as tolyl and xylyl and aralkyl radicals such as benzyl. R can also be any monovalent halogenated hydrocarbon radical, for instance, haloalkyl radicals such as monochloromethyl, 2,2-dibromoethyl, 5,5,5-trifluoro-2-(trifluoromethyl)amyl and 5,10,15-triiodopentadecyl, halocycloalkyl radicals such as 1,2-dibromocyclopentyl, 2,3,3-trifluoro-2-chlorocyclobutyl and perchlorocyclohexyl, haloalkenyl radicals such as 2-chlorovinyl, 3,3-dibromoallyl and 3-iodobutadienyl, halocycloalkenyl radicals such as 3-fluoro-2,3-cyclopentenyl and 3-chloro-4-bromo-3,4-cyclohexenyl, haloaryl radicals such as 2,4,6-trifluorophenyl, 4,4'-dibromoxenyl radicals such as α,α,α- and β-chloronaphthyl, haloalkaryl radicals such as α,α,α-trifluorotolyl and 2,4-dibromotolyl, and haloaralkyl radicals such as (perfluorophenyl)methyl, 3,5-diiodobenzyl and α-bromobenzyl.

Specific examples of silanes of this invention are 5,5,5-trifluoro-2-(trifluoromethyl)amylvinyl - 2-iodocyclohexylchlorosilane, bis[5,5,5-trifluoro-2-(trifluoromethyl)amyl]-monochlorosilane, tris[5,5,5-trifluoro-2-(trifluoromethyl)-amyl]chlorosilane, 5,5,6,6,6-pentafluoro - 2 - (perfluoroethyl)hexyldichlorosilane, 5,5,6,6,7,7,7-heptafluoro-2-(trifluoromethyl)heptylmonochlorosilane, 7,7,7-trifluoro-2,4-bis(trifluoromethyl)heptylchlorobenzyldichlorosilane, 9,9,9-trifluoro-2,4,6-tris(trifluoromethyl)nonyltrichlorosilane, 7,7,8,8,8-pentafluoro-2,4-bis(perfluoroethyl)octyl - 2,4,-dibromotolylmonochlorosilane, 5,5,5-trifluoro-2-(trifluoromethyl)amyl-5,5,6,6,6 - pentafluoro - 2-(perfluoroethyl)-hexylphenylchlorosilane, bis[5,5,5-trifluoro - 2-(trifluoromethyl)amyl] - 4,4' - dibromoxenylchlorosilane, 5,5,5-trifluoro-2 - (trifluoromethyl)amylcyclopentenylchloromethylchlorosilane, and 5,5,6,6,6 - pentafluoro - 2 - (trifluoromethyl(hexylxylyldichlorosilane.

The silanes of this invention are best prepared by heating a mixture of a fluoroalkene of the formula YCH=CH₂, where Y is as above defined, with a silane of the formula $R_m SiH_a Cl_{4-m-a}$, whereupon the telomers of the formula $$H(\overset{Y}{C}HCH_2)_n \overset{Y}{C}=CH_2$$

are formed in situ and subsequently add to the silane by olefinic addition. For best results there should be at least one mol, preferably more, of alkene per mol of silane.

These reactions are best carried out at a temperature ranging from 150 to 300° C. The presence of a catalyst, such as platinum supported on charcoal or chloroplatinic acid, is preferred, but no catalyst is necessary. Reactor pressure of 1000–1200 pounds per square inch gauge is preferred although any pressure will increase the yield. No pressure is necessary.

It is believed that the process of telomerization of the alkene is due to a free radical mechanism initiated by the SiH compound. If desired, the telomerization of the olefin can be carried out separately in the presence of any free radical generator capable of activating the olefin, such as peroxides. The resulting telomer is then reacted with the SiH compound.

An alternative method is via the Grignard method. This method involves preparing compounds of the formula $$H(\overset{Y}{C}HCH_2)_n \overset{Y}{C}HCH_2X$$

where X is halogen, forming a Grignard reagent therefrom and reacting it with a silane of the formula $R_m SiCl_{4-m}$. This method is preferred when it is desired to put two different fluorinated radicals on the silicon and/or when R is an unsaturated aliphatic radical.

The fluorinated olefins and the silanes employed as initial ingredients in this invention are known compounds and may be prepared by any suitable method.

This invention also relates to siloxanes comprising at least one mol percent of units of the formula $$[H(\overset{Y}{C}HCH_2)_n]_a SiR_m O_{\frac{4-m-a}{2}}$$

any remaining units being of the formula $$Z_b SiO_{\frac{4-b}{2}}$$

where Y, R, $n$, $a$ and $m$ are as above defined, Z is selected from the group consisting of hydrogen and monovalent organic radicals attached to the silicon through C—Si linkages and $b$ is an integer from 0 to 3 inclusive.

Z can be hydrogen, or any monovalent organic radical attached to the silicon through SiC bonds such as those listed under R above and in addition, any monovalent organic radical attached to the silicon through C—Si linkages which contains any of the following functions: hydroxy, carboxy, epoxy, aldo, amino, azo, azoxy, cyano, alkoxy, hydrazine, keto, mercapto, nitro, nitroso, alkylthio, sulfino, sulfonyl, sulfo, sulfinyl, ureido, amido and quaternary ammonium. The Z groups can contain more than one function. When $b$ is 0, composition (2) has the unit formula [SiO₂].

When less than one mol percent of composition (1) is present, its beneficial effect on the copolymer is reduced to the level of insignificance.

The siloxanes of this invention are best prepared by hydrolyzing and condensing either singly or in any mixture the telomeric chlorosilanes of this invention with or without silanes of the formula $Z_b SiCl_{4-b}$ by the conventional hydrolysis techniques applicable to chlorosilanes. If desired, the hydrolysis can be carried out in the presence of solvents such as ethers, toluene, xylene or other hydrocarbons. As usual, the hydrolyzates can be further condensed to high polymers by the use of an alkaline catalyst such as NaOH or KOH or an acid catalyst such as HCl or H₂SO₄. These high polymers are suitable for use in preparing elastomers and are best prepared by polymerizing the cyclic diorganosiloxanes.

Another method of preparing the siloxane copolymers is by catalytic copolymerization using mixed siloxanes.

It is to be understood that the siloxanes employed herein can be either homopolymeric materials or copolymeric materials containing two or more different types of siloxane units and further that the organic radicals attached to any one silicon atom can be the same or different as long as they are within the scope of the claims.

The chlorosilanes of this invention can be directly applied to diverse articles such as masonry, textile, ceramics, paper, wood, etc. In such uses, hydrolysis takes place from atmospheric and/or absorbed water to provide water repellency, hydrocarbon solvent repellency and improved dielectric properties. The silanes of this invention are also useful as intermediates in the production of the fluid, elastomeric and resinous siloxanes of this invention, the fluids of which are useful as lubricants and hydraulic fluids.

Elastomers prepared from the siloxanes of this invention may contain any suitable filler. Organic fillers such as cork, wood flour, cotton linters, and organic fabric can be used, but the preferred fillers are inorganic materials, for example, metal oxides such as titania, zinc oxide, ferric oxide and the like; siliceous materials such as clay, diatomaceous earth, crushed quartz and silicas such as fume silica, silica aerogels and silica xerogels. If desired, the fillers, particularly the silicas, may be treated with chlorosilanes or in other ways so that the surfaces thereof have organosilyl groups attached to the silicon by SiOSi linkages. For example, the surfaces of the fillers can be modified with trimethylsilyl groups, phenyldimethylsilyl groups, 3,3,3,-trifluoropropyldimethylsilyl groups and dimethylvinylsilyl groups by the method shown in the copending application of Leslie J. Tyler, Serial No. 160,100, filed May 4, 1950.

The fillers can be employed in any desired amount ranging from 5 parts to over 200 parts per 100 parts of polymer. The precise amount of filler employed in any case will vary with the type of filler and the properties desired in the finished elastomer.

If desired, the elastomers of this invention can also contain further additives such as compression set additives, pigments, oxidation inhibitors and other materials commonly employed in organosiloxane rubbers. These include additives to improve handling characteristics as shown in the copending application of Thomas D. Talcott entitled "Silicone Rubber of Improved Handling Properties."

The elastomeric compositions of this invention can be vulcanized by any of the known methods for vulcanizing organosiloxane elastomers. One of the preferred methods comprises heating the compounded elastomer with an organic peroxide such as benzoyl peroxide, tertiary-butyl perbenzoate, dicumyl peroxide, chlorobenzoyl peroxides, and tertiary-butyl peracetate. Preferably, these peroxides are employed in amounts from 0.1 to 10 percent by weight based on the weight of the polysiloxane.

Alternatively the elastomers of this invention may be vulcanized by incorporating therein an alkylpolysilicate such as ethylpolysilicate and a salt of a carboxylic acid such as lead naphthenate or dibutyltindiacetate. These compositions vulcanize at room temperature. A second room temperature vulcanizing process is that of incorporating small amounts of a hydrogen-containing siloxane such as methylhydrogenpolysiloxane in the composition and adding the salt of a carboxylic acid such as lead 2-ethylhexoate. When this method is employed, the base polymer should contain silicon-bonded hydroxyl groups.

The elastomers are useful for the preparation of hoses, seals, linings for fuel tanks and for electrical insulation which is subjected to fuels, lubricating oils and hydraulic fluids.

Resins prepared from the siloxanes of this invention can be cured by any conventional method and can contain inorganic fillers such as glass fibers, glass powders, asbestos, silica flour, mica dust, silicon metal, bentonite, calcium carbonate, ceramic powders, metal oxides and clays, and organic fillers such as carbon black as well as pigments, oxidation inhibitors and the like.

The resins of this invention are particularly useful for impregnating, encapsulating and potting electrical equipment, for coating electrical conductors and for use as protective coatings for metal fabric and other surfaces.

The following examples are illustrative only and are not intended to limit the scope of this invention which is properly set forth in the claims.

*Example 1*

A mixture of 3,3,3-trifluoropropene and methyldichlorosilane in a mol ratio of 2:1 and chloroplatinic acid present in the amount of 0.004 gram platinum per gram-mol olefin were pumped at a pressure of 1000 to 1200 pounds per square inch gauge into a continuous reactor operating at 250° C. The reacting materials were in the reactor for less than one hour. The reactor product was fractionated and produced pure 5,5,5-trifluoro-2-(trifluoromethyl)amylmethyldichlorosilane with the following properties: B.P. 80° C./24 mm.; S.G. (25° C.), 1.302; $n_D^{25}$ 1.3828. The distillation residue contained the compound 7,7,7 - trifluoro - 2,4 - bis(trifluoromethyl)heptylmethyldichlorosilane.

*Example 2*

The 5,5,5 - trifluoro - 2-(trifluoromethyl)amylmethyldichlorosilane of Example 1 was hydrolyzed without a solvent. The hydrolyzate was washed neutral with aqueous sodium bicarbonate. Then potassium hydroxide was added in the amount of 0.05 percent by weight hydrolyzate and the mixture was heated at 160 to 170° C. to condense any remaining silanols. The product was cracked at 200 to 220° C. and pure sym-tris-[5,5,5-trifluoro - 2 - (trifluoromethyl)amyl]trimethylcyclotrisiloxane was obtained with the following properties: B.P., 175° C./5 mm.; $n_D^{25}$ 1.3706.

The cyclic trisiloxane was heated at 150° C. for 6½ hours in the presence of NaO[CF₃CH₂CH₂Si(Me)O]₂Na catalyst present in such amount that the ratio of Na/Si in the system was 1:4000. A gum was produced having the unit formula $$[H(\overset{CF_3}{\underset{}{C}}HCH_2)_2]\overset{Me}{\underset{}{Si}}O$$

*Example 3*

100 parts by weight of the gum of Example 2 were milled with 35 parts silica filler, 5 parts hydroxy-end-blocked dimethylsiloxane fluid containing 3.7 percent by weight OH, and 2 parts benzoyl peroxide. The durometer hardness (D), tensile strength (T), and percent maximum elongation (E) were measured for samples of the stock as molded and after curing as shown below:

| Stock condition | D | T (p.s.i.) | E (percent) |
|---|---|---|---|
| As molded (10 min. at 125° C.) | 43 | 510 | 300 |
| Cured 24 hrs. at 150° C | 68 | 640 | 180 |

The cured sample was immersed for 24 hours at room temperature in ASTM Reference Fuel B, conforming to Specification MIL–H–3136, Type III, and consisting of 70 parts by volume isooctane and 30 parts toluene. Volume swell of the rubber was found to be 27 percent.

*Example 4*

When 5,5,5-trifluoro-2-(trifluoromethyl)amylmethyldichlorosilane is reacted in an equimolar ratio with a vinyl Grignard reagent, the result is 5,5,5-trifluoro-2-(trifluoromethyl)amylvinylmethylchlorosilane.

Example 5

When this silane is hydrolyzed, sym-bis[5,5,5-trifluoro-2-(trifluoromethyl)amyl]divinyldimethyldisiloxane fluid is obtained.

Example 5

3,3,3-trifluoropropene was mixed with dimethylchlorosilane in a molar ratio of 2:1. The mixture heated in a bomb at 250° C. for 8 to 10 hours. The product was fractionated and produced pure 5,5,5-trifluoro-2-(trifluoromethyl)amyldimethylchlorosilane with the following properties: B.P., 81° C./25 mm.; S.G. (25° C.), 1.223; $n_D^{25}$ 1.3789.

Example 6

The 5,5,5-trifluoro-2-(trifluoromethyl)amyldimethylchlorosilane of Example 5 was hydrolyzed to give a fluid sym-bis[5,5,5-trifluoro-2-(trifluoromethyl)amyl]tetramethyldisiloxane.

When the 5,5,5-trifluoro-2-(trifluoromethyl)amyldimethylchlorosilane of Example 5 is mixed with SiCl$_4$, cohydrolyzed and cocondensed in a molar ratio of 4:1, the fluid tetrakis[5,5,5-trifluoro-2-(trifluoromethyl)amyldimethylsiloxy]silane is produced.

Example 7

3,3,3-trifluoropropene was mixed with trichlorosilane in a molar ratio of 2:1. The mixture was heated in a bomb at 250° C. for 8 to 10 hours. The product was fractionated and produced pure 5,5,5-trifluoro-2-(trifluoromethyl)amyltrichlorosilane with the following properties: B.P., 76° C./24 mm.; density, 1.388.

When 5,5,5-trifluoro-2-(trifluoromethyl)amyltrichlorosilane is hydrolyzed and condensed, a resin having the unit formula

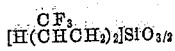

is produced.

Example 8

When 3,3,4,4-pentafluorobutene is substituted for the 3,3,3-trifluoropropene in Example 1, 5,5,6,6,6-pentafluoro-2-(perfluoroethyl)hexylmethyldichlorosilane results.

Example 9

When an equimolar mixture of 3,3,4,4,5,5,5-heptafluoropentene and 3,3,3-trifluoropropene is substituted for the 3,3,3-trifluoropropene in Example 1, 5,5,5-trifluoro-2-(perfluoropropyl)amylmethyldichlorosilane is produced.

Example 10

When the 5,5,6,6,6-pentafluoro-2-(perfluoroethyl)hexylmethyldichlorosilane of Example 8 and 5,5,5-trifluoro-2-(perfluoropropyl)amylmethyldichlorosilane of Example 9 are each hydrolyzed and cracked in accordance with the method of Example 2, sym-tris[5,5,6,6,6-pentafluoro-2-(perfluoroethyl)hexyl]trimethylcyclotrisiloxane and sym-tris[5,5,5-trifluoro-2-(perfluoropropyl)amyl]trimethylcyclotrisiloxane respectively are produced.

Example 11

When the following silanes are substituted for the methyldichlorosilane of Example 1, the corresponding telomer silanes are produced:

Phenyldichlorosilane — 5,5,5-trifluoro-2-(trifluoromethyl)-amylphenyldichlorosilane.

Isopropyldichlorosilane — 5,5,5-trifluoro-2-(trifluoromethyl)-amylisopropyldichlorosilane.

Chloromethyldichlorosilane — 5,5,5-trifluoro-2-(trifluoromethyl)-amylchloromethyldichlorosilane.

Trifluoropropyldichlorosilane — 5,5,5-trifluoro-2-(trifluoromethyl)-amyltrifluoropropyldichlorosilane.

2,6-dibromo-p-tolyldichlorosilane — 5,5,5-trifluoro-2-(trifluoromethyl)-amyl-2,6-dibromo-p-tolyldichlorosilane.

When these silane products are hydrolyzed without a solvent and the hydrolyzates washed neutral with aqueous sodium bicarbonate, the corresponding fluid siloxanes are obtained.

Example 12

Sym-tris[5,5,5-trifluoro-2-(trifluoromethyl)amyl]-trimethylcyclotrisiloxane, sym-tris[3,3,3-trifluoropropyl]-trimethylcyclotrisiloxane, and sym-trimethyltrivinylcyclotrisiloxane in a mol ratio of 15:184:1 respectively were mixed with NaO[CF$_3$CH$_2$CH$_2$Si(Me)O]$_2$Na in such amount that the Na/Si ratio was 1:4000. The sym-tris[3,3,3-trifluoropropyl]trimethylcyclotrisiloxane was prepared as described in the copending application of Ogden R. Pierce and George W. Holbrook, Serial No. 594,108, filed June 27, 1956.

The mixture was heated for one hour at 150° C. A gum copolymer resulted consisting of 7.5 mol percent 5,5,5-trifluoro-2-(trifluoromethyl)amylmethylsiloxane units, 92 mol percent 3,3,3-trifluoropropylmethylsiloxane units, and 0.5 mol percent methylvinylsiloxane units.

Example 13

100 parts by weight of the gum copolymer of Example 12 were milled with 30 parts silica filler, 5 parts hydroxy-endblocked dimethylsiloxane fluid containing 3.7 percent by weight OH, and 1 part benzoyl peroxide. The durometer hardness (D), tensile strength (T), and percent maximum elongation (E) were measured for samples of the stock as molded and after curing as shown below:

| Stock condition | D | T (p.s.i.) | E (percent) |
|---|---|---|---|
| As molded (10 min. at 125° C.) | 48 | 1,050 | 310 |
| Cured 24 hr. at 150° C | 72 | 965 | 180 |

Example 14

An equimolar mixture of sym-tris[5,5,5-trifluoro-2-(trifluoromethyl)amyl]trimethylcyclotrisiloxane and sym-tris[3,3,3-trifluoropropyl]trimethylcyclotrisiloxane was mixed with NaO[CF$_3$CH$_2$CH$_2$Si(Me)O]$_2$Na in such amount that the Na/Si ratio was 1:4000. The mixture was heated for 1½ hours at 150° C. A gum copolymer resulted consisting of 50 mol percent 5,5,5-trifluoro-2-(trifluoromethyl)amylmethylsiloxane units and 50 mol percent 3,3,3-trifluoropropylmethylsiloxane units.

Example 15

100 parts by weight of the gum copolymer of Example 14 were milled with 30 parts silica filler, 5 parts hydroxy-endblocked dimethylsiloxane fluid containing 3.7 percent by weight OH, and 2 parts benzoyl peroxide. The durometer hardness (D), tensile strength (T) and percent maximum elongation (E) were measured for samples of the stock as molded and after curing as shown below.

| Stock condition | D | T (p.s.i.) | E (percent) |
|---|---|---|---|
| As molded (10 min. at 125° C.) | 40 | 465 | 580 |
| Cured 24 hrs. at 150° C | 75 | 680 | 290 |

Samples of this stock cured 24 hours at 150° C. were immersed for 70 hours at room temperature in each of n-butanol and ASTM Reference Fuel B. Volume swell was measured as shown below:

Solvent:                 Volume swell (percent)

n-Butanol ------------------------------- 1

Fuel B ------------------------------- 23

Example 16

100 parts by weight of a gum copolymer consisting of 7.5 mol percent 5,5,5-trifluoro-2-(trifluoromethyl)-amylmethylsiloxane units and 92.5 mol percent 3,3,3-trifluoropropylmethylsiloxane units were milled with 30 parts silica filler, 5 parts hydroxy-endblocked dimethylsiloxane fluid containing 3.7 percent by weight OH, and 1.5 parts benzoyl peroxide.

The durometer hardness (D), tensile strength (T) and percent maximum elongation (E) were measured for samples of the stock as molded and after curing as shown below:

| Stock condition | D | T (p.s.i.) | E (percent) |
|---|---|---|---|
| As molded (10 min. at 125° C.) | 53 | 1,030 | 420 |
| Cured 24 hrs. at 150° C | 70 | 1,100 | 240 |

Samples of stock cured 24 hours at 150° C. were immersed for 70 hours in the following solvents under the conditions shown and showed the following volume swell (ΔV) and change in durometer hardness (ΔD).

| Solvent | Temperature, °F | ΔV (Percent) | ΔD |
|---|---|---|---|
| ASTM Oil No. 3 | 300 | +3 | −9 |
| Fuel B | Room | +17 | −9 |
| Turbooil 15 [1] | 350 | +8 | −10 |

[1] Turbooil 15 is a diester oil conforming to Specification MIL–O–7808.

Samples of stock cured 24 hours at 150° C. were tested by the "Method of Measuring Stiffening of Rubber by the Gehman Torsional Apparatus," ASTM D1053–54T.

Temperature (°.):                    Reading, degrees
−76                                            9
−67                                            58

This indicates a stiffening point at approximately −70° F.

*Example 17*

When the following silanes are substituted for the dimethylchlorosilane of Example 5, the corresponding telomer silanes are produced. When any of these telomer silane products are hydrolyzed, the corresponding disiloxanes are produced.

| | | |
|---|---|---|
| Diphenylchlorosilane | 5,5,5-trifluoro-2-(trifluoromethyl)-amyl-diphenylchlorosilane. | Sym-bis[5,5,5-trifluoro-2-(trifluoro-methyl)amyl] tetraphenyldisiloxane. |
| Phenylmethylchlorosilane | 5,5,5-trifluoro-2-(trifluoromethyl)-amyl-phenylmethylchlorosilane. | Sym-bis[5,5,5-trifluoro-2-(trifluoro-methyl)amyl] diphenyldimethyldisiloxane. |
| p-Chlorobenzylcyclohexyl chlorosilane | 5,5,5-trifluoro-2-(trifluoromethyl)-amyl-p-chlorobenzylcyclohexylchlorosilane. | Sym-bis[5,5,5-trifluoro-2-(trifluoro-methyl)amyl] di-p-chlorobenzyldicyclo-hexyldisiloxane. |
| α,α,α-Trifluorotolylxenylchlorosilane | 5,5,5-trifluoro-2-(trifluoromethyl)-amyl-α,α,α-trifluorotolylxenylchlorosilane. | Sym-bis[5,5,5-trifluoro-2-(trifluoro-methyl)amyl]di-α,α,α-trifluorotolyl-dixenyldisiloxane. |

*Example 18*

When 5,5,5-trifluoro-2-(trifluoromethyl)amyltrichlorosilane is copolymerized with 3,3,3-trifluoropropyltrichlorosilane and vinyltrichlorosilane in an equimolar ratio in accordance with the method of Example 10, a resin containing equimolar proportions of mono-5,5,5-trifluoro-2-(trifluoromethyl)amylsiloxane, mono-3,3,3-trifluoropropylsiloxane and monovinylsiloxane results.

*Example 19*

When 5,5,5-trifluoro-2-(trifluoromethyl)amyltrichlorosilane is cohydrolyzed and cocondensed in an equimolar ratio with each of the following silanes, resin copolymers are formed each containing 50 mol percent 5,5,5-trifluoro-2-(trifluoromethyl)amylsiloxane units and 50 mol percent of the siloxane units shown below:

| | |
|---|---|
| Me₃SiO CH₂CH₂CH₂SiCl₂ (Me) | HOCH₂CH₂CH₂Si(Me)O |
| Me₃SiO O C CH(Me) CH₂SiCl₂ (Me) | HOOCCH(Me)CH₂Si(Me)O |
| MeOOCCH(Me)CH₂SiCl₂ (Me) | MeOOCCH(Me)CH₂Si(Me)O |
| NCCH₂CH₂SiCl₂ (Me) | NCCH₂CH₂Si(Me)O |
| (Me₃Si)₂NCH₂CH₂CH₂SiCl₂ (Me) | H₂NCH₂CH₂CH₂Si(Me)O |
| H₂NC(O)CH₂CH₂SiCl₂ (Me) | H₂NC(O)CH₂CH₂Si(Me)O |
| ClCH₂CH₂CH₂SiCl₂ (Me) | ClCH₂CH₂CH₂Si(Me)O |
| SiH(Me)Cl₂ | SiH(Me)O |

*Example 20*

When an equimolar resin copolymer of 5,5,5-trifluoro-2-(trifluoromethyl)amylsiloxane units and 3-chloropropylmethylsiloxane units is dissolved in an inert solvent and reacted with pyridine, a resin copolymer results containing 50 mol percent 5,5,5-trifluoro-2-(trifluoromethyl)-amylsiloxane units and 50 mol percent

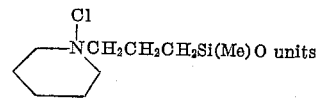

units

*Example 21*

When a mixture of 3,3,3-trifluoropropene and dichlorosilane in a mol ratio of 1:1 and chloroplatinic acid present in the amount of 0.004 gram platinum per gram mol olefin are heated together in accordance with the procedure of Example 1 and the reactor product is fractionated, 5,5,5-trifluoro-2-(trifluoromethyl)amyldichlorosilane is obtained.

When this silane product is hydrolyzed and condensed under neutral or acidic conditions, a polymer will result with the unit formula

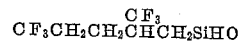

*Example 22*

When 5,5,5-trifluoro-2-(trifluoromethyl)amyldichlorosilane is reacted with 3,3,3-trifluoropropene in accordance with the procedure of Example 1, bis[5,5,5-trifluoro-2-(trifluoromethyl)amyl]dichlorosilane is obtained.

When the silane is hydrolyzed bis[5,5,5-trifluoro-2-(trifluoromethyl)amyl]siloxane is obtained.

That which is claimed is:

1. A composition of the formula

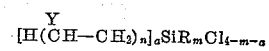

where Y is a perfluoroalkyl radical of from 1 to 3 inclusive carbon atoms, R is selected from the group consisting of monovalent hydrocarbon radicals, their halogenated derivatives and hydrogen, $n$ is an integer from 2 to 4 inclusive, $a$ is an integer from 1 to 3 inclusive, $m$ is an integer from 0 to 2 inclusive and $m+a$ is not more than 3.

2. The composition of claim 1 where Y is the trifluoromethyl radical.

3. A composition of the formula $$[\text{H}(\overset{\text{CF}_3}{\text{C}}\text{HCH}_2)_2]\text{SiCl}_2$$

4. A composition of the formula $$[\text{H}(\overset{\text{CF}_3}{\text{C}}\text{HCH}_2)_2]\overset{\text{H}}{\text{Si}}\text{Cl}$$

5. A composition of the formula $$[\text{H}(\overset{\text{CF}_3}{\text{C}}\text{HCH}_2)_2]\overset{\text{Me}}{\text{Si}}\text{Cl}$$

6. A siloxane comprising at least one mol percent of (1) units of the formula $$[\text{H}(\overset{Y}{\text{C}}\text{HCH}_2)_n]_a\text{SiR}_m\text{O}_{\frac{4-m-a}{2}}$$

any remaining units being of the formula $$\text{Z}_b\text{SiO}_{\frac{4-b}{2}}$$

where Y is a perfluoroalkyl radical of from 1 to 3 inclusive carbon atoms, R is selected from the group consisting of monovalent hydrocarbon radicals, their halogenated derivatives and hydrogen, $n$ is an integer from 2 to 4 inclusive, $a$ is an integer from 1 to 3 inclusive, $m$ is an integer from 0 to 2 inclusive, $m+a$ being not greater than 3, Z is selected from the group consisting of hydrogen and monovalent organic radicals attached to the silicon through C—Si linkages and $b$ is an integer from 0 to 3 inclusive.

7. A composition in accordance with claim 6 where Y is trifluoromethyl.

8. A composition of the unit formula $$[\text{H}(\overset{\text{CF}_3}{\text{C}}\text{HCH}_2)_2]\overset{\text{Me}}{\text{Si}}\text{O}$$

9. A composition of the formula $$(\text{CF}_3\text{CH}_2\text{CH}_2\overset{\text{CF}_3}{\text{C}}\text{HCH}_2\overset{\text{Me}}{\text{Si}}\text{O})_3$$

10. A composition of the unit formula $$[\text{H}(\overset{\text{CF}_3}{\text{C}}\text{HCH}_2)_2]\overset{\text{H}}{\text{Si}}\text{O}$$

References Cited in the file of this patent

Pierce et al.: "Jour. Amer. Chem. Soc.," vol. 75 (1953), pp. 5618–20.

McBee et al.: Ibid., vol. 77 (1955), pp. 1292–3.

Tarrant: Wright Air Development Center Technical Report 55–220 (August 1955), pages 19, 21 and 22.

Tarrant et al.: Ibid., part 2 (May 1956), pages 10, 12 and 13.

UNITED STATES PATENT OFFICE

CERTIFICATE OF CORRECTION

Patent No. 2,894,969                                                  July 14, 1959

Ogden R. Pierce

It is hereby certified that error appears in the printed specification of the above numbered patent requiring correction and that the said Letters Patent should read as corrected below.

Column 7, line 36, for "Temperature (° .)" read --Temperature (°F.)--.

Signed and sealed this 1st day of December 1959.

(SEAL)
Attest:

KARL H. AXLINE                                              ROBERT C. WATSON
Attesting Officer                                       Commissioner of Patents